Aug. 11, 1953 R. A. SHIELDS 2,648,447
VEHICLE UNLOADER
Filed Feb. 24, 1949 2 Sheets-Sheet 1
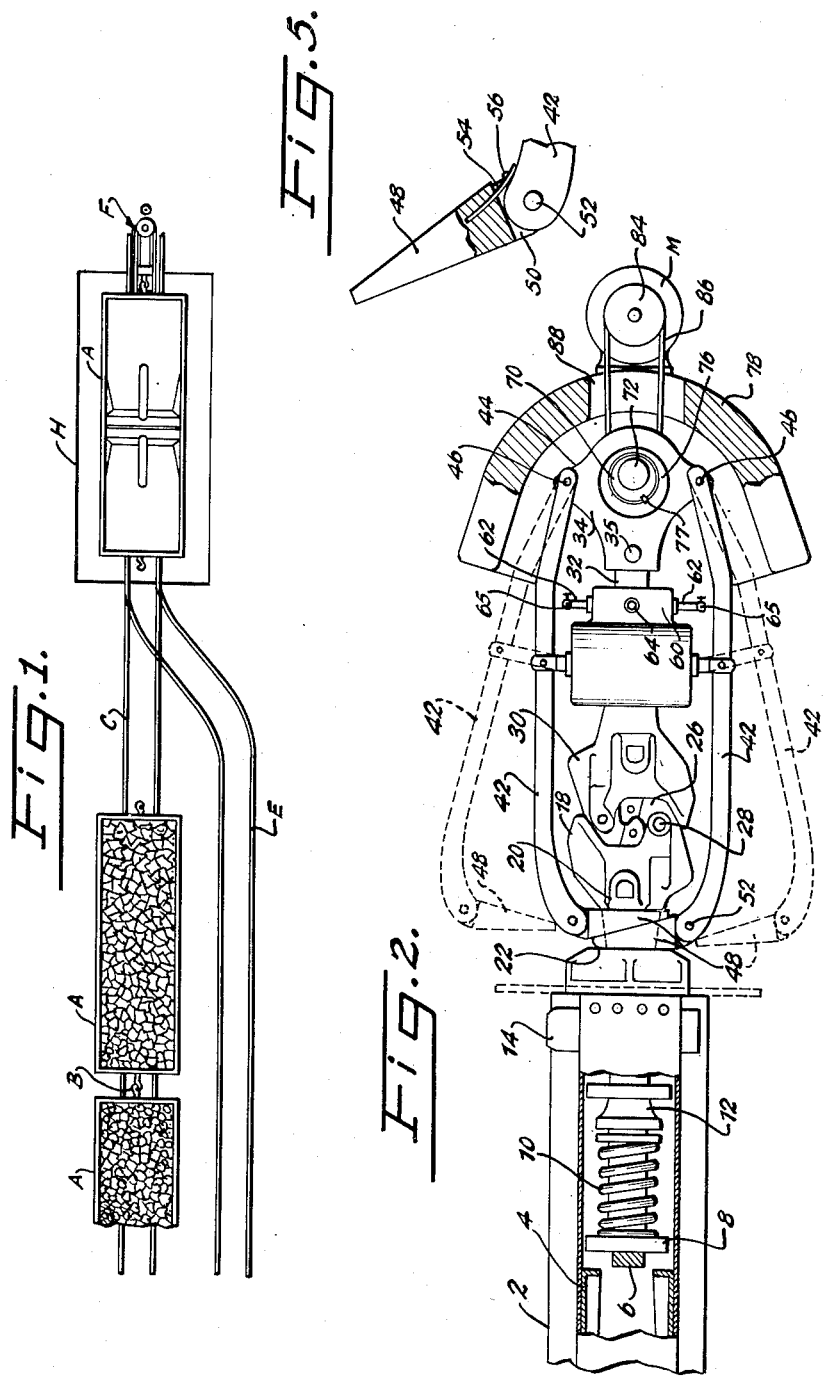
Inventor
Robert A. Shields Aug. 11, 1953
R. A. SHIELDS
2,648,447
VEHICLE UNLOADER
Filed Feb. 24, 1949
2 Sheets-Sheet 2
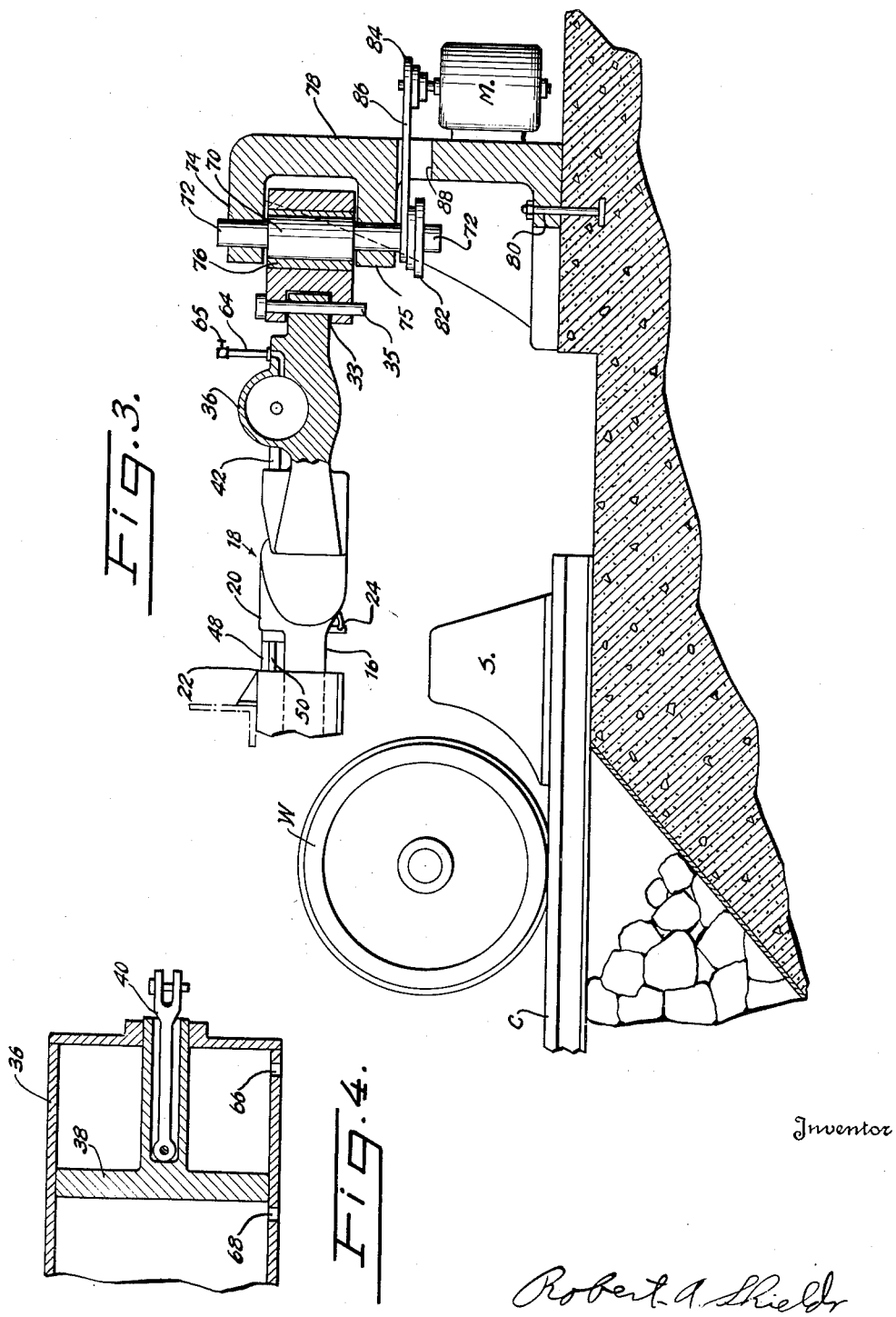
Inventor
Robert A. Shields Patented Aug. 11, 1953

2,648,447

UNITED STATES PATENT OFFICE 2,648,447

VEHICLE UNLOADER

Robert A. Shields, Bloomsburg, Pa., assignor to American Car and Foundry Company, New York, N. Y., a corporation of New Jersey Application February 24, 1949, Serial No. 78,177

15 Claims. (Cl. 214—64.2)

This invention relates to vehicle unloaders in general and in particular to unloaders which are to be used with railway hopper cars of the bottom discharge type.

Bottom discharge vehicles have in the past been unloaded by various methods such as by use of vibrators, augers, and spears or wedges. Spears or wedges are frequently dropped onto the car structure, severely damaging the same and in cases where the lading does not immediately yield the vehicle sides are bulged and frequently destroyed. Augers, like wedges, frequently damage the car structure and cannot get all of the lading out of the vehicle for it is impossible to reach into corners and adjacent the side stakes, cross wedges or similar obstructions. In unloading by means of vibrators a massive vibrator of ten or twelve tons weight is lowered onto the top plate of the car and then is caused to vibrate at a relatively high frequency. This high frequency vibration, while removing the lading from all portions of the car also causes failure of the car structure. As an example, one of the vibrators tested on a riveted railway hopper caused failure by shearing off rivets in the braces and this after only five minutes of vibration. On a more rigid all welded car the vibrator caused failure by splitting of the side sheets adjacent the center of the car and in a period of less than fifteen minutes. Thus it will be seen that all of the methods heretofore used are extremely destructive of the car structure and the forces are applied in a direction in which the vehicle is not particularly strong.

Railway hopper cars must be designed to resist large end forces due to braking and haulage strains. Also the slope sheets incline longitudinally downwardly toward the hopper openings and it is in this direction that the discharging force should be directed to cause proper discharge. It is an object therefore of the present invention to provide an unloader which will shake or jar the car in longitudinal direction so as to displace the lading.

A further object of the invention is the provision of an unloader which can be quickly connected to the standard vehicle coupler and through which shaking or jarring forces can be transmitted to the vehicle.

A still further object of the invention is the provision of a car unloader which can be connected to the standard car coupler and which has provision for blocking out the normal resilient connection of the coupler to the car.

These and other objects of the invention will be apparent to persons skilled in the art from a study of the following description and accompanying drawings in which—

Fig. 1 is a plan view of an installation for longitudinal shaking of railway hopper cars, Fig. 2 is an enlarged view of the improved shaker coupled to a car and with parts broken away to better disclose the construction, Fig. 3 is an elevational view with parts in section and substantially on the longitudinal center line of the shaker, Fig. 4 is an enlarged detail of the operating cylinder, and Fig. 5 is an enlarged detail of one of the lock out wedges with portions broken away to better disclose the construction.

Referring now to the drawings in detail it will be seen that the vehicles illustrated are railway hopper cars A, connected together by means of standard couplers B, and adapted to run on rails C. The cars are adapted to be singly spotted over a bin or hopper H and when empty to be pushed onto an empty car track E. When the loaded cars are spotted over the hopper H they will be connected to and shook or jarred by the unloader F, which in the present case is firmly fixed to the hopper structure.

Hopper cars vary in the number of hoppers and arrangement of the discharge openings but in each case all hopper cars are provided with a relatively massive center sill 2 to which are attached back stops 4 and ahead of which is positioned the coupler assembly B. As illustrated in Fig. 2 the coupler assemby includes a yoke 6, a rear follower plate 8, springs 10, and friction dampening devices 12. As is customary the yoke 6 is keyed by means of a key 14 to the shank 16 of the car coupler head 18. The coupler head includes an upstanding portion or horn 20 which, under excessive buffing strains, will contact the striker casting 22 rigidly attached to the end of the center sill structure and of sufficient strength to absorb the buffing shocks in case of spring failure. Under normal conditions the rear follower 8 will be resting against the back stops 4 and the horn 20 will be spaced three inches forwardly from the striker 22. As is standard with all railway type couplers an unlocking device 24 is provided by means of which the knuckles 26 can be released for rotation about their pin mount 28, thus permitting the couplers to separate.

The vehicle shaker F includes a standard coupler head 30 which is adapted to couple with the car coupler and which is provided with a shank 32 extending rearwardly and into a pocket 33 formed in a projecting portion of an eccentric collar 34. The shank is pivotally connected to the eccentric collar by means of a pin 35, thus permitting small relative angular motion between the coupler shank and eccentric collar. The shank 32 has preferably formed integral therewith a cylinder 36 in which is mounted two pistons 38 and two push rods 40 each pivotally connected to the respective piston and wedge arm 42. The wedge arms 42 have one of their ends extending into a pocket formed in ears 44 of the eccentric collar and pivotally connected thereto by pins 46. The opposite ends of the wedge arms have pivotally mounted thereon wedges 48. The wedges as clearly shown are formed with a projecting ear 50 adapted to be inserted between the bifurcated ends of the wedge arms and pivotally connected thereto by means of pins 52. As shown the wedge arms are adapted to bear on shoulders of the wedges, thus relieving the pins 52 of shearing strains. In order to hold the wedges in proper position relative to the wedge arms one end of springs 54 are inserted in slots cut in the wedges and the other end anchored as at 56 to the wedge arm. Fluid pressure may be supplied to the cylinder 36 by means of a distribution box 60, preferably cast integral with the shank 32 and into which pipes 62 may be inserted for supplying wedge closing fluid to the pistons and also into which a pipe 64 may be inserted for supplying wedge opening fluid to the pistons. Flow of fluid into and out of pipes 62 and 64 will be controlled by suitable valves 65. Fluid from pipes 62 may enter the ends of the cylinder through ports 66 and fluid from the pipe 64 may enter the center of the cylinder through port 68, all as clearly shown on Fig. 4.

In order to cause movement of the eccentric collar 34 an eccentric 70 is provided having journals 72 journaled in upper and lower brackets 74 and 75, respectively, which brackets are preferably cast integral with a massive post structure 78. Throw of the collar 34 can be adjusted by rotation of eccentric spacer 76 locked to the eccentric at 77 after the desired adjustment of throw has been made. The post structure is securely bolted or otherwise anchored to the hopper supporting structure as indicated at 80 in Fig. 3. The lower journal shaft is extended below the bracket 75 for reception of a change speed pulley 82 adapted to be driven by a change speed pulley 84 by means of a belt 86. The pulley 84 is mounted on the shaft of a prime mover such as a motor M which motor is preferably of the variable speed type and securely bolted or otherwise fastened to the back of the post 78. As clearly shown the belt 86 extends through a slot or opening 88 formed in a central portion of the post structure.

In operation a car such as A loaded with lading will be pushed along the rail C into position over the hopper H and will have its coupler coupled to the similar coupler of the vehicle shaker. Accidental damage to the shaker and post structure will be prevented by stops S fastened to the rails C. Following this spotting and coupling operation the remaining loaded cars of the train will be pulled to the position as shown in Fig. 1 so that the car over the hopper bin can when emptied be run out on the empty car track E.

After coupling of the loaded car to the shaker coupling, air or other motive fluid will be admitted through the valves to the pipes 62, thus bringing the pistons inwardly toward the center of the cylinder 36 and pulling arms 42 from the dotted position of Fig. 2 to the full line position thereof. During this closing of the wedge arms the wedges 48 will be jammed into the space between striker 22 and horn 20 thereby forcing the car away from the coupler horn and bringing the follower plate 8 and back stops 4 into the position shown in Fig. 2, substantially locking or immobilizing the coupler relative to the car. In this position the spring 10 will be compressed sufficiently to permit longitudinal shaking of the car without any particular spring movement occurring. After the wedges have been brought into position the prime mover M will be started thus rotating the eccentric 70 and causing the eccentric collar 34 to oscillate in a longitudinal direction thereby oscillating the car which is connected thereto by the standard couplers. In case the wedges do not reach their full seated position prior to turning on the prime mover M they will quickly assume such position following the turning on of the prime mover since they will still be under fluid pressure caused by fluid admitted through pipes 62. Following the longitudinal shaking of the car and either prior to or subsequent to turning off the prime mover M fluid will be admitted to pipe 64 and exhausted from pipes 62 thus separating the pistons of cylinder 36 and bringing the wedge arms and wedges to the dotted position of Fig. 2. The car may now be uncoupled by use of its release mechanism 24 and pushed onto the empty track E.

Shock to the shaker and load on the prime mover M may be materially reduced by turning on the prime moved prior to any engagement of the wedge 48. Under such operation the prime mover will only cause oscillation of the coupler with the energy absorbed in the springs 10 and friction devices 12 of the coupler assembly. When the prime mover is up to speed then air or other fluid can be admitted to cylinder 36 through pipes 62 and the wedges 48 forced into position blocking the relative movement between horn 20 and striker 22 and giving a relatively rigid connection between the eccentric and the car in both directions.

Certain older types of cars do not have the friction devices 12 and the power required to oscillate the car can be materially reduced by modifying the speed of rotation of the eccentric. Proper selection of speed through the change speed pulleys or other devices or through the variable speed prime mover will allow selection of a speed such that resonance of the springs 10 will be attained.

All railway cars including hopper cars such as here shown and as more fully disclosed at pages 272 and 273 of the 1946 Car Builders Encyclopedia are mounted on trucks, one wheel of which is indicated at W in Fig. 3. In these trucks clearances are necessary for proper operation of the car on the tracks. That is, clearances must be provided between the journal brasses and journal boxes and between the journal boxes and pedestal guides, if separate boxes are used. The car body sets on the truck bolster through the medium of center plates and slight longitudinal clearances are necessary here. Also the truck bolster sets on springs and longitudinal clearances are necessary between the bolster and bolster guides. The sum of all these necessary clearances will vary from one half of an inch in a new truck to an inch or more in an old truck. By proper adjustment of the eccentric spacer 76 the throw of the eccentric and accompanying oscillation of the car can be adjusted so as to oscillate the car a lesser amount than the sum of the truck clearances. In this manner the rotational inertia of the wheels and axles need not be overcome and the car can be shaken longitudinally without movement of the wheels on the rail and without damaging the car journals or other structure.

While the invention has been described in detail and with particular reference to the drawings it will be obvious to persons skilled in the art that various modifications and rearrangements of parts can be made without departing from the scope of the invention as defined by the following claims.

I claim:

1. In a vehicle unloader of the shaker type for clearing the lading from bottom discharge vehicles having a body and a resiliently mounted coupler connected thereto, the combination of a supporting structure, an oscillator mounted on the supporting structure and including a prime mover and a coupler adapted to be connected to the vehicle coupler, and blocking means movable into position between portions of the vehicle body and vehicle coupler to substantially block resilient movement of the coupler relative to the vehicle body during oscillation thereof by the oscillator.

2. In a vehicle unloader of the shaker type for clearing the lading from bottom discharge vehicles having a body and a resiliently mounted coupler connected thereto, the combination of a supporting structure, an eccentric rotatably mounted on the supporting structure, a prime mover for rotating the eccentric, eccentric collar means mounted on the eccentric, a coupler element connected to the collar means and adapted to couple with the vehicle coupler, wedge arms pivotally carried at one end by the eccentric collar, wedges on the other end of said wedge arms movable into position between the vehicle body and vehicle coupler to substantially block resilient movement of the coupler relative to the vehicle body, and means to move said wedges into and out of said position.

3. The combination of claim 2 characterized in that an eccentric spacer is interposed between said eccentric and eccentric collar to adjust the throw of the eccentric collar, and means is provided to lock said eccentric spacer in predetermined adjusted position.

4. In an unloading device for a hopper car, said car including a body, wheeled trucks, and a coupler, and means for vibrating said car body including a base, a power driven oscillator mounted on said base, means for varying the speed and stroke of said oscillator, a fluid motor mounted on said base, blocking members for engaging the car coupler to substantially fix the same with respect to the car body, and a coupler connected to and operated by said oscillator and adapted to be coupled with said car coupler during the engagement of the blocking members and car coupler.

5. In an apparatus for vibrating a hopper car body during its unloading operation, said car being mounted on wheeled trucks and being provided with a coupler element having spring retarded longitudinal shifting movement, a power actuated oscillator, a coupler element connected to and oscillated by said oscillator and arranged for coupling association with said car coupler, and means interposed between a portion of said car coupler and said car body to restrict its shifting movement during oscillation by said power oscillator.

6. In an apparatus for vibrating a hopper car body during its unloading operation, said car being mounted on wheeled trucks and being provided with a coupler element having spring retarded longitudinal shifting movement, a power actuated oscillator, a coupler element connected to and oscillated by said oscillator and arranged for coupling association with said car coupler, and means mounted for movement between a portion of said car coupler and the car body during initial application of the oscillator to restrict shifting movement of the coupler and thereby directly apply movement of the oscillator to the car body.

7. In an apparatus for vibrating a hopper car body during its unloading operation, said car being mounted on wheeled trucks and being provided with a coupler element having a spring retarded longitudinal shifting movement, a power actuated oscillator, a support for said oscillator, a coupler element connected to and oscillated by said oscillator and arranged for coupling association with said car coupler, a blocking member mounted for movement between a portion of said coupler and said car body to restrict the movement of said coupler with respect to said body, and power means for moving said blocking member into and away from its blocking position.

8. The substance of claim 7 characterized in that the power means for the blocking member is so constructed and arranged as to maintain said member in blocking position during the operation of the oscillator.

9. The substance of claim 7 characterized in that the power means for the blocking member is so constructed and arranged that said member may be gradually moved to blocking position during the initial operation of the oscillator.

10. In a lading carrying railway vehicle having a body, wheels and axles and a longitudinally shiftable coupler member, said coupler member normally projecting beyond the car body and including at its extremity a coupler jaw for interengagement with a similar jaw of a coacting coupler, spring means associated with said coupler member normally regulating its longitudinal movement under buff and draft, said coupler including a projection adjacent its outer end portion, said projection having a wall substantially parallel to a wall of the car with which it is associated, and blocking means comprising a pair of wedges movable into position between said projection and the adjacent substantially parallel portion of the car, said wedges being so constructed and arranged as to be interengageable to limit the longitudinal movement of the coupler within predetermined limits, whereby substantially unified movement of the car by the coupler may be accomplished.

11. In a vehicle unloader of the shaker type for clearing the lading from bottom discharge vehicles having a body and a resiliently mounted coupler connected thereto, the combination of a supporting structure, a power driven oscillating member carried by said supporting structure, shiftable means for regulating the stroke of said oscillating member, means for regulating the speed of oscillation by control of the application of power thereto, a coupler element connected to said oscillating member, said connecting means permitting movement of said coupler element for engagement with said resiliently mounted coupler, a pivoted arm mounted upon said supporting structure, a blocking member carried at one end portion of said arm for blocking movement between the outer end portion of said resiliently mounted coupler and an adjacent portion of said vehicle body to substantially lock said resiliently mounted coupler against resilient movement relative to said vehicle body, and power means for moving said arm to position said blocking member.

12. The substance of claim 11 characterized in that blocking member is pivotally mounted at one end portion of the arm and means are provided for normally retaining the blocking member in a predetermined position to insure its proper association with the coupler when moved to blocking position.

13. In combination with a bottom discharge hopper car having a resiliently mounted coupler, an unloading device for clearing the lading from said hopper car including a coupler member adapted to engage the resiliently mounted coupler of the hopper car, power means for oscillating the coupler member in a direction longitudinally of the hopper car, and means for substantially immobilizing the resiliently mounted coupler of the hopper car while engaged with said coupler member.

14. In combination with a bottom discharge hopper car having a resiliently mounted coupler, an unloading device for clearing the lading from said hopper car including a coupler member adapted to engage the resiliently mounted coupler of the hopper car, power means for vibrating the coupler member in a direction longitudinally of the hopper car, and mechanism on said unloading device operable to substantially immobilize the resiliently mounted coupler of the hopper car while it is engaged with said coupler member.

15. In a device for vibrating a hopper car body while being unloaded and which is adapted to be operatively connected with the resiliently mounted coupler of the car, means for substantially immobilizing the car coupler relative to the car body whereby vibrations may be transmitted directly thereto comprising, a pair of arms pivotally carried at one end by said device and extending adjacent opposite sides of the car coupler, wedges on the other ends of said arms movable into a position between the car body and car coupler where they are mutually engageable to substantially prevent resilient movement of the coupler relative to the car body, and power means on the vibrating device operatively connected with said arms for moving the wedges to and from said position.

ROBERT A. SHIELDS.

References Cited in the file of this patent

UNITED STATES PATENTS

| Number | Name | Date |
|---|---|---|
| 1,593,303 | Hill | July 20, 1926 |
| 2,284,226 | Oglesby | May 26, 1942 |
| 2,498,764 | Meier | Feb. 28, 1950 |
| 2,512,110 | McPeck | June 20, 1950 |

FOREIGN PATENTS

| Number | Country | Date |
|---|---|---|
| 483,870 | Germany | Oct. 9, 1929 |